Feb. 15, 1944. J. C. HEINTZ 2,341,988
POWER STITCHER
Filed Feb. 20, 1941

Inventor
James C. Heintz
By Gordon C. Mack
Attorney

Patented Feb. 15, 1944

2,341,988

UNITED STATES PATENT OFFICE 2,341,988

POWER STITCHER

James C. Heintz, Lakewood, Ohio

Application February 20, 1941, Serial No. 379,905

12 Claims. (Cl. 154—9)

This invention relates to a power stitcher and the method of using it to unite a new tread to an old tire carcass.

The invention includes a new type of pressure roller. The roller is concave and laterally or radially movable. The support for the pressure roller is pivoted so that it may be swung over and then away from the work and it may be locked in position when over the work or tire support. The pressure roller is slidably mounted on a driven shaft which telescopes into a hollow screw to one end of which the roller is fastened and the screw may be turned in a thread rigidly connected with the support for the roller.

With this type of structure the new tread may be pressed to the carcass of the old tire while the tire is held vertically on the tire support. For pressing the edges of the tread to the carcass and for insuring a tight union between the new tread and the carcass at the shoulders the tire is tilted and the desired pressure is obtained with the edges of the pressure roller which, due to the concavity of its surface, are raised.

Figure 1:
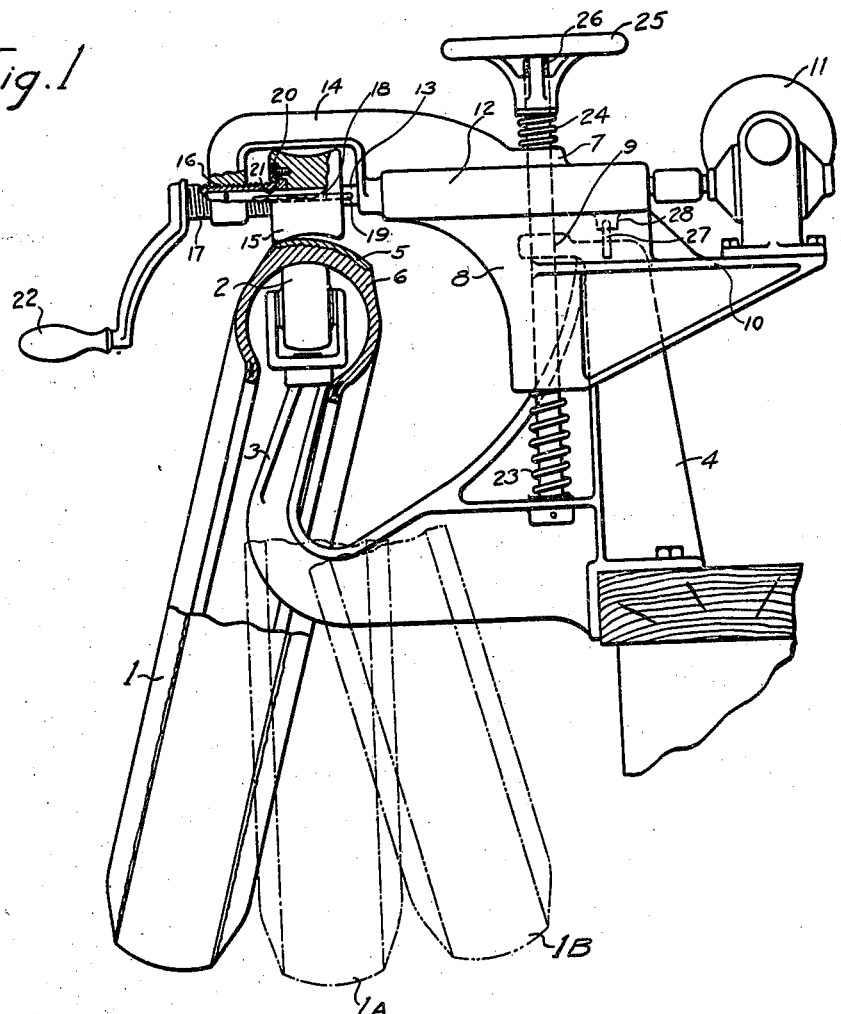
Figure 2:
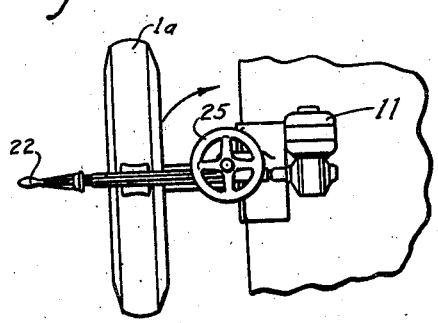

The invention will be further described in connection with the accompanying drawing in which Fig. 1 is an elevation partly in section and Fig. 2 is a plan view on a reduced scale.

The drawing shows the tire 1 supported in a tilted position on the work support 2. This work support is a cylinder about 3 or 6 inches wide and about 5 inches in diameter with a surface somewhat rounded which in general fits the inner surface of the tires which are to be retreaded. This work support is rotatably mounted on the arm 3 of the bracket 4. The dotted lines show the tire in the positions 1A and 1B which are positions which it will be necessary for the tire to assume during the stitching of the new tread onto the old carcass. The new unvulcanized tread 5 is shown in place on the old carcass 6.

The shaft 7 is supported at its lower end by the arm 3. It passes through the casting 8 and is more particularly supported by the arm 9 of the bracket 4. The casting 8 comprises a support 10 on which the motor 11 is mounted. This may be a one-quarter horsepower motor. It is connected with the drive shaft 13 through reduction gears to develop the proper speed for the normal operator. The casting 8 also comprises the housing 12 for the shaft 13 and, at the end of the arm 14 which extends beyond the pressure roller 15, the threaded opening 16 through which the hollow screw 17 passes.

The pressure roller 15 is for example, about 4 inches wide and being concave is about 5 inches in diameter at the center and about 6 inches in diameter at each end. It is slidably splined to the shaft 13 by the key 18 which fits into the keyway 19. The pressure roller is fastened onto one end of the hollow screw 17. As the hollow screw 17 is threaded in and out of the opening 16 by turning the handle 22 the pressure roller 15 slides axially on the shaft 13. The pressure roller may thus be moved laterally with respect to the tire support 2 while it is being rotated by the shaft 13 which is driven by the motor 11.

The casting 8 which supports pressure roller 15 and the motor 11 is floated between the springs 23 and 24. The lower spring 23 supports the casting and the upper spring 24 between the casting and the hand wheel 25 which screws onto the thread 26 at the upper end of the shaft 7, presses the pressure roller 15 against the tire but with a yielding pressure. The hand wheel is not screwed so far onto the shaft 7 for a tire with a thick tread as for a thinner tire.

The pin 27 is fastened to the top of the bracket 4. It fits into a recess in the stud 28 which is formed on the casting 8. On screwing the hand wheel toward the top of the shaft 7 the whole of the casting 8 may be lifted easily so that the stud 28 clears the pin 27. The whole of the casting may then be pivoted around the shaft 7 as indicated by the arrow in Fig. 2. By swinging the casting around to the left there is no hindrance to placing a tire on the tire support 2 or removing a tire from this support after the stitching of the new tread to the carcass has been completed.

To recap a tire the old tread is buffed off. The tread may be channel out as shown, or the new surface may follow the curvature of the carcass from one side of the tire to the other. Next, the buffed surface is cemented. The new tread stock is then laid in place around the whole circumference of the tire. The tire is placed on the tire support 2 in the vertical position 1A indicated in dotted lines. The casting 8 is then swung to bring the pressure roller 15 over the work support and the pin 27 sinks into the recess in the stud 28 to lock the pressure roller in this position. The hand wheel 25 is then screwed onto the shaft and the pressure roller is set against the tread stock with yielding pressure sufficient to unite the new rubber to the old and to drive out all the air between the tread stock and the buffed surface.

With the center of the pressure roller 15 approximately in line with the center of the tire support 2 the motor 11 is started up and the pressure roller set in motion. The rotation of the roller in pressure contact with the tire causes the tire to rotate and the tire support rotates with it. In this way the central portion of the new tread is united to the central portion of the carcass.

After sufficient rotation of the tire to unite the central portion of the tread stock to the central portion of the buffed surface of the tire the motor is stopped and the tire is tilted to the position shown in full lines and indicated by the reference numeral 1. The hand wheel 25 may be loosened somewhat as necessary to permit this shifting of the tire. By turning the handle 22 the pressure roller 15 is screwed to the right so that its left hand edge is just to the left of the center line of the tire support 2. The left hand edge of the pressure roller 15 is then in contact with a portion of the new tread stock 5 which contacted the pressure roller 15 when the tire was in an upright position. The current is now turned on, the motor 11 starts driving the pressure roller 15. As the tire is rotated the handle 22 is slowly cranked to move the pressure roller 15 to the left and to the edge of the new tread stock. Due to the pressure of the pressure roller on the new tread stock it is firmly bonded to the cemented surface of the tire and as the pressure roller is moved progressively toward the edge of the new tread stock all air between the tread stock and the carcass is squeezed out to the edge of the new tread and the tread is firmly bonded to the carcass.

The motor is now shut off and the hand wheel 25 is again loosened and the tire is shifted to the position shown in dotted lines and indicated by the numeral 1B. The pressure roller is screwed toward the left and the hand wheel 25 is tightened. The right hand edge of the pressure roller now contacts the new tread stock somewhat to the right of the center line of the tire support. As the pressure roller presses the new tread stock to the carcass it is screwed to the right to repeat the operation just described in connection with the left hand side of the new tread. In this way the new tread is bonded to the carcass of the tire and all air is removed between the new tread stock and the carcass. The retreaded tire is now ready for curing.

Due to the floating mounting of the casting 8 and the ability to regulate the pressure by adjusting the hand wheel 25 tires of any thickness may be treated on this apparatus. The tire support 2 will accommodate tires of considerable size variations. It is not necessary to use different supports for tires of different diameter or thickness. Tire supports of different designs may be employed but they must be capable of being tilted from one side to the other as necessary. Different means for mounting the pressure roller so that it can be swung away from the work support may be employed. Furthermore, the pressure roller may be united to the screw by different means and different means may be employed to permit moving the pressure roller axially over the work support while it is in rotation.

I claim:

1. A power stitcher for recapping pneumatic tires which comprises an arm extending upwardly and on this a tire support on which the tire may be tilted laterally and turned circumferentially, and over this a pressure roller with a concave surface with means for rotating the same, and means for moving the pressure roller axially while it is being rotated.

2. A power stitcher for recapping pneumatic tires which comprises an arm extending upwardly and on this a tire support on which a tire may be tilted laterally and turned circumferentially, and over this a pressure roller with a concave surface axially slidable and also movable laterally to and from its position directly over the tire support.

3. A power stitcher for recapping pneumatic tires which comprises an arm extending upwardly and on this a tire support on which a tire may be tilted laterally and turned circumferentially, over this a pressure roller with a concave surface and movable to and from its working position over the tire support, and means for locking the pressure roller in its working position over the tire support.

4. A power stitcher for recapping pneumatic tires which comprises an arm extending upwardly and on this a tire support on which a tire may be tilted laterally and turned circumferentially, yieldably mounted in pressure relation thereto a pressure roller with a concave surface axially slideable on a shaft to which it is splined and means for driving said shaft.

5. In a power stitcher for recapping pneumatic tires, an arm extending upwardly and on this a tire support on which a tire may be tilted laterally and turned circumferentially, a pressure roller mounted near the tire support and adapted to apply pressure to the outer surface of a tire while it is on the tire support, and driving means for rotating the roller and means for moving the roller axially while it is being rotated.

6. In a power stitcher for recapping pneumatic tires, a pressure roller with a concave surface, a shaft on which the roller is slidably mounted, means for driving the shaft and means for driving the roller therefrom, and a hollow screw to one end of which the roller is fastened and into which hollow screw the driving shaft telescopes, the screw being adapted to rotate independently of the shaft.

7. In a power stitcher for recapping pneumatic tires, a tire support, a pressure roller, a shaft on which the roller is slidably mounted, means for driving the shaft and means for driving the roller therefrom, and a hollow screw to one end of which the roller is fastened and into which hollow screw the driving shaft telescopes, the screw being turnable in a thread rigidly connected with the support for the roller and being rotatable independently of the shaft.

8. In a power stitcher for recapping pneumatic tires, an arm extending upwardly and on this a tire support on which a tire may be tilted laterally and turned circumferentially, and a pressure roller with a concave surface and means for driving the same, the roller being axially movable, and the tire support and the pressure roller being adapted to be yieldably pressed toward one another.

9. The process of stitching new tread stock to to the carcass of a tire on a power stitcher having a driven pressure roller with a concave surface which comprises the steps of tilting the tire about a line substantially perpendicular to the axis of the pressure roller to bring one side of the new tread nearer the corresponding side of the pressure roller, then applying said side of the pressure roller to the tread stock near the center of the tread but toward said side of the new tread while rotating the tire about its axis, and then progressively bringing said side of the pressure roller and said side of the tread stock together, and finally applying said side of the roller to said side of the tread whereby air is removed from between the carcass of the tire and the portion of the tread thereby pressed to the carcass.

10. The process of stitching new tread stock to the carcass of a tire on a power stitcher having a driven pressure roller with a concave surface which comprises the steps of tilting the tire about a line substantially perpendicular to the axis of the pressure roller to bring one side of the new tread nearer the corresponding side of the pressure roller, then applying said side of the pressure roller to the tread stock near the center of the tread but toward said side of the new tread while rotating the tire about its axis without changing the plane of its rotation, and then progressively bringing said side of the pressure roller and said side of the tread stock together, and finally applying said side of the roller to said side of the tread whereby air is removed from between the carcass of the tire and the portion of the tread thereby pressed to the carcass.

11. The process of stitching new tread stock to the carcass of a tire on a power stitcher having a driven pressure roller with a concave surface which comprises the steps of tilting the tire about a line substantially perpendicular to the axis of the pressure roller to bring one side of the new tread nearer the corresponding side of the pressure roller, then applying said side of the pressure roller to the tread stock near the center of the tread but toward said side of the new tread while rotating the tire about its axis without changing the plane of its rotation, and then moving the pressure roller so as to bring said side of the pressure roller and said side of the tread stock together and finally applying said side of the roller to said side of the tread whereby air is removed from between the carcass of the tire and the portion of the tread thereby pressed to the carcass.

12. In a power stitcher for recapping pneumatic tires, a pressure roller with a concave surface and a tire support on which the tire is supported and adapted to be tilted about a line substantially perpendicular to the axis of the pressure roller, the roller being axially movable, and the tire support and the pressure roller being adapted to be yieldably pressed toward one another.

JAMES C. HEINTZ.